(12) United States Patent
Scarlette

(10) Patent No.: US 6,399,689 B1
(45) Date of Patent: Jun. 4, 2002

(54) ABRASION RESISTANT COATINGS

(75) Inventor: Terry Lane Scarlette, Thomasville, NC (US)

(73) Assignee: Lilly Industries, Inc., Indianapolis, IN (US)

( * ) Notice: Subject to any disclaimer, the term of this patent is extended or adjusted under 35 U.S.C. 154(b) by 0 days.

(21) Appl. No.: 09/518,604

(22) Filed: Mar. 3, 2000

Related U.S. Application Data

(60) Provisional application No. 60/122,850, filed on Mar. 4, 1999, and provisional application No. 60/122,661, filed on Mar. 3, 1999.

(51) Int. Cl.$^7$ ................................................. C08K 3/18
(52) U.S. Cl. ............................................................ 524/430
(58) Field of Search ........................................ 524/430

(56) References Cited

U.S. PATENT DOCUMENTS

| | | |
|---|---|---|
| 1,910,444 A | 5/1933 | Nicholson |
| 3,041,156 A | 6/1962 | Rowse et al. |
| 4,314,827 A | 2/1982 | Leitheiser et al. |
| 4,600,649 A | 7/1986 | Leo |
| 4,623,364 A | 11/1986 | Cottringer et al. |
| 4,744,802 A | 5/1988 | Schwabel |
| 4,770,671 A | 9/1988 | Monroe et al. |
| 4,785,049 A * | 11/1988 | Balaba ........................ 525/61 |
| 4,800,685 A | 1/1989 | Haynes, Jr. |
| 4,881,951 A | 11/1989 | Wood et al. |
| 4,900,763 A | 2/1990 | Kraushaar |
| 4,964,883 A | 10/1990 | Morris et al. |
| 4,997,461 A | 3/1991 | Markoff-Matheny et al. |
| 5,009,675 A | 4/1991 | Kunz et al. |
| 5,011,508 A | 4/1991 | Wald et al. |
| 5,164,348 A | 11/1992 | Wood |
| 5,193,978 A | 3/1993 | Gutierrez |
| 5,213,951 A | 5/1993 | Delfino |
| 5,219,806 A | 6/1993 | Wood |
| 5,429,647 A | 7/1995 | Larmie |
| 5,551,963 A | 9/1996 | Larmie |
| 5,780,525 A | 7/1998 | Ryang et al. |
| 5,840,433 A * | 11/1998 | Juma .......................... 428/689 |
| 6,074,278 A * | 6/2000 | Wu .............................. 451/28 |

FOREIGN PATENT DOCUMENTS

| | | |
|---|---|---|
| EP | 0 395 088 | 10/1990 |
| EP | 0 853 095 A1 | 7/1998 |
| JP | WO97/48774 | 6/1997 |

OTHER PUBLICATIONS

Erickson et al., "Historical Development of Abrasive Grain," *Ceramic Transactions*, vol. 95: p 73–83 (1998).

Lawn et al., "Equilibrium Penny–like Cracks in Indentation Fracture," *Journal of Materials Science*, 10:pp 2016–2024; (1975).

Database WPI, Section Ch, Week 199722, Derwent Publications Ltd., London, GB; Class A14, AN 1997–241929 XP002141757 & JP 09 078002 A (Toyo Ink Mfg Co Ltd), Mar. 25, 1997 abstract.

\* cited by examiner

*Primary Examiner*—Paul R. Michl
(74) *Attorney, Agent, or Firm*—Barnes & Thornburg

(57) ABSTRACT

A coating composition for forming abrasion-resistant coatings is described. It has been found that sol gel process aluminum oxide grain can be added to a film-forming resin composition for producing coatings exhibiting exceptional abrasion resistance.

16 Claims, No Drawings

ABRASION RESISTANT COATINGS

CROSS REFERENCE TO RELATED APPLICATIONS

The present application claims benefit of U.S. provisional patent application Ser. No. 60/122,850, filed Mar. 4, 1999, and U.S. provisional patent application Ser. No. 60/122,661, filed Mar. 3, 1999.

FIELD OF THE INVENTION

This invention relates to a composition and method for forming abrasion resistant coatings. More particularly, this invention is directed to novel coating compositions containing a sol gel aluminum oxide grain in amounts sufficient to provide coatings exhibiting enhanced abrasion resistance.

BACKGROUND AND SUMMARY OF THE INVENTION

The application of protective or decorative coatings is a common processing step in many manufacturing protocols. One important functional property of such coatings, whether they be applied for a decorative or a protective function, is abrasion resistance. Disruption of the integrity of the applied coatings by abrasive contact with other surfaces during shipment or in the ordinary use of the coated surfaces can affect the appearance of the coatings and their effectiveness in protecting the underlying surface. Accordingly, there has been a significant research and development effort directed to the formulation of coating compositions which exhibit abrasion resistance along with other desirable coating characteristics such as flexibility, hardness, adhesion, transparency, translucency, and the like.

Abrasion resistance is a particularly important and desirable property for coating formulations used on surfaces which in use are subjected to abrasive contacts with other objects, such as flooring, shelving and the like. The use of coatings exhibiting good abrasion resistance on such surfaces prolongs both the appearance and the functionality of the coating compositions.

Therefore, in accordance with this invention there is provided a coating composition for forming abrasion resistant coatings. The invention is based, at least in part, on the discovery that the use of a sol gel process grain or grain composition as an additive at effective levels in a resin coating composition provide coatings exhibiting surprisingly enhanced abrasion resistance.

Typical coating compositions in accordance with this invention comprise a film-forming resin composition and a sol gel process ceramic grain composition wherein the ceramic grain contains aluminum oxide and wherein the aluminum oxide grain forms about 1 to about 60 percent by weight of the coating. The film-forming resin component of the present coating composition is preferably a thermosetting or UV-curable resin of the type used in decorative and protective coating compositions.

In another embodiment of the present invention improved abrasion resistant surface finishes are applied in a coating protocol utilizing at least one sealer or primer coating composition to form a sealer coat and at least one top coat composition to form a surface top coat. The improved surface finish and method comprises using an improved sealer and/or top coating composition comprising a film-forming resin composition and a sol gel processed ceramic grain in an amount effective to impart abrasion resistance to the surface finish.

DETAILED DESCRIPTION OF THE INVENTION

In accordance with one embodiment of this invention there is provided a curable coating composition for forming abrasion-resistant coatings. The coating composition comprises a film-forming resin composition, most typically a thermosetting resin or a UV-curable resin, and a sol gel processed grain composition. The film-forming resin composition is formulated to include an amount of a sol gel ceramic grain composition sufficient to enhance the abrasion resistance in the resulting cured coatings.

In one embodiment of the invention the film-forming resin of the present coating composition is a thermosetting resin composition comprising epoxy resins, acrylic resins, polyester resins, urea resins, melamine resins or polyurethane resins.

In another embodiment of the invention the film-forming resin composition comprises a UV-curable resin, typically a UV-curable resin comprising olefin-functional monomers and olefin-functional oligomers and polymers. Typically such formulations include a combination of mono- and multi-functional olefin oligomers or polymers. See, for example, the disclosures of U.S. Pat. Nos. 4,600,649; 4,902,975; 4,900,763; and 4,065,587, the disclosures of which are incorporated herein by reference. In one preferred embodiment of the invention there is provided a coating for forming abrasion resistant coating compositions, particularly for wood floor applications, wherein the coating composition comprises mono-olefin functional and multi-olefin functional polyurethane monomers, oligomers and polymers.

Typically the present coating compositions comprise about 40 to about 90 percent by weight of a film-forming resin composition and about 10 to about 60 weight percent of a sol gel process ceramic grain, typically an aluminum oxide composition. Of course, such coating compositions can, and typically do, include other standard coating additives such as resin-dependent curing agents or catalysts, flow aids, wetting agents, dispersing agents, pigments, dyes, fillers, fibers, antistatic agents, lubricants, surfactants, plasticizers, rheology modifiers, and coupling agents. Thus, for example, coating compositions of this invention utilizing UV-curable resins typically include effective amounts (about 0.1 to about 3 percent by weight) of one or more photoinitiators. Such compositions can be cured by electron beam irradiation without photoinitiators.

The coating composition may also, for example, contain a coupling agent. Exemplary of such coupling agents suitable for use in this invention include organo silanes, zircoaluminates and titanates. The coupling agent may be added directly to the coating composition. Alternatively, the ceramic grain may be pre-treated with the coupling agent before the grain is added to the coating composition. The coupling agent is added in an amount typically between 0.1 to 5% by weight of the ceramic particle weight.

The mineral component of the present coating compositions comprises a form of alumina made by sol gel processing. These products, sometimes referred to as sol gel process ceramic grain are commercially available from several sources. In one embodiment of the invention the sol gel processed alumina grain is a product sold under the name Cubitron® by 3M Corporation.

Sol gel processed grain compositions such as those for use in accordance with this invention are often specified, inter alia, by grain size, ranging from about JIS 240 down to JIS 8000. These grain sizes correspond to a particle size range from about 130 $\mu$m down to about 0.5 $\mu$m. The sol process grain component of the present composition can be of a homogeneous grain size or several grain sizes in combination. In one embodiment of the present invention, the sol gel process grain forms about 1 to about 60 percent by weight of the coating, more typically about 10 to about 40 percent by weight of the coating with a grain size of JIS 320 or smaller. In one embodiment, JIS 400 sol gel process aluminum oxide grain is used alone or in combination with smaller and/or larger grain size material. Sealer coats/primer coats in accordance with the present invention typically have higher weight percents of the grain composition than grain-filled top coat compositions. Top coat compositions are usually formulated to contain about 1 to about 15 percent of the sol gel processed grain while sealer/primer coat composition are most typically formulated to contain about 10 to about 40, more preferably about 10 to about 30 percent by weight of the sol gel process grain.

The ceramic grain particles may also contain a surface coating. Surface coatings are known to improve the adhesion between the ceramic particle and the film-forming resin composition binder in abrasive articles. Such surface coatings are described in U.S. Pat. Nos. 5,011,508; 1,910,444; 3,041,156; 5,009,675; 4,997,461; and 5,213, 951.

The coating compositions of the present invention are applied using art-recognized coating application techniques including spray coating, curtain coating, reverse roll coating, vacuum coating, extrusion coating, or direct or differential roll coating applications. The viscosity of the coating compositions of the present invention is not critical; thus, the present invention encompasses coating compositions of any given viscosity containing a film-forming resin composition and a sol gel processed ceramic grain. Typically, the viscosity of the coating compositions can range from about 200 centipoise up to about 8000 centipoise depending on the grain loading the nature of the film-forming resin components of the composition. The compositions are prepared utilizing standard coating formulation techniques. Thus, the ceramic grain composition can be blended into or sifted onto, for example, floor finishing compositions for providing coatings with enhanced abrasion resistance without compromise of other functionally significant properties such as flexibility, hardness, adhesion and the like.

Most surface finishing protocols comprise the steps of applying at least one sealer/primer coating composition to form a sealer/primer coat and one top coating composition to form a surface top coat. The finished surfaces can be prepared to have improved abrasion resistance using an improved sealer coating or top coating composition in accordance with this invention, i.e., one comprising a film-forming resin composition and a sol gel process ceramic grain in an amount effective to impart enhanced abrasion resistance to the sealer coat. In some coating protocols, for example, those used in applying coatings for wood flooring, the wood surface is coated with at least two sealer coats, more typically two to five sealer coats prior to application of one or more top coat compositions. The surface finish can be formed to have exceptional abrasion resistance wherein, during the coating process, at least one of the applied sealer coats is a sol process grain filled coating composition of the present invention. In one embodiment, at least two sealer coats of the present invention are applied to the surface before application of the top coat.

In still another embodiment of this invention, the top coat is a sol gel process grain filled coating composition in accordance with this invention. Top coat formulations typically are formulated to contain lower levels of grain, generally in the range of about 1 to about 15 percent by weight of fine grain, typically JIS 400 or finer. In one embodiment, the surface being coated is a wood surface intended for use in flooring applications and the film-forming resin composition of both the sealer and top coats are UV-curable 100 percent solids compositions comprising a combination of mono-olefin functional and multi-olefin functional monomers, oligomers and polymers.

Preparation: Sol gel processed ceramic grain for use in this invention may be made according to the following procedure:

Mixing step: An alumina-based mixture is prepared that comprises an alumina precursor, optionally an acid, and liquid medium. The alumina precursor is capable of being sintered into alpha alumina. The preferred alumina precursor is alpha alumina monohydrate, commonly referred to as boehmite. Examples of other alumina precursors include alpha alumina powders, gamma alumina powders, aluminum formoacetate, aluminum nitrofomoacetate and aluminum salts.

One useful alpha alumina monohydrate is commercially available from the Alcoa Company. Other alpha alumina monohydrates are commercially available from Condea GmbH, Hamburg, Germany. Preferred alumina monohydrates are in the alpha form, and include relatively little, if any, hydrated phases other than monohydrates (although very small amounts of trihydrate impurities can be present in some commercial grade boehmite, which can be tolerated). These monohydrates typically have a low solubility in water and have a high surface area (typically at least about 180 $m^2/g$).

The liquid medium in which the boehmite mixed is typically water. The water may be tap water, distilled water or deionized water. In some instances, it is preferable to heat the aqueous medium (e.g., 30–70° C.) to improve the mixing of the boehmite.

The mixture may further comprise peptizing agents; these peptizing agents are generally soluble ionic compounds which are believed to cause the surface of a particle or colloid to be uniformly charged in the liquid medium (e.g., water). Preferred peptizing agents are acids or acid compounds. Examples of typical acids include monoprotic acids such as acetic, hydrochloric, formic, and nitric acid, with nitric acid being preferred. Typically, the mixture contains at least 0.1 to 20% by weight, preferably 1% to 10% by weight acid and most preferably 3 to 8% by weight acid, based on the weight of boehmite in the mixture. In some instances, the acid may be applied to the surface of the alpha alumina monohydrate particles prior to being combined with the water.

The mixture may further comprise a nucleating material or nucleating material precursor such as alpha alumina, alpha iron oxide, an alpha iron oxide precursor and/or chromia. Additional details regarding nucleating materials are disclosed, for example, in U.S. Pat. Nos. 4,623,364; 4,744,802; 4,964,883; 5,139,978; and 5,219,806. An example of a nucleating material is iron oxide or an iron oxide precursor. Sources of iron oxide, which in some cases may act as or provide a material that acts as a nucleating material, include hematite (i.e., $\alpha\text{-Fe}_2O_3$), as well as precursors thereof (i.e., goethite ($\alpha$-FeOOH), lepidocrocite ($\gamma$-FeOOH), magnetite ($Fe_3O_4$), and maghemite ($\gamma\text{-Fe}_2O_3$)).

The alumina mixture may further comprise other metal oxide precursors, sometimes referred to as a metal oxide modifier. The term precursor means that the material is capable of being converting into metal oxide under appropriate sintering conditions. The amount of the metal oxide precursor added to the mixture is calculated and determined based upon the desired amount in the final sintered mineral particle. These other metal oxides may alter the physical and chemical properties of the resulting mineral particle. The metal oxide precursor may be added to the mixture as 1) a metal salt, 2) a metal oxide particle or 3) a colloidal suspension of the metal oxide. Preferably these precursors are added as a metal salt and examples of metal salts include metal nitrate salts, metal acetate salts, metal citrate salts, metal formate salts, and metal chloride salts. For metal oxide particles, it is generally preferred that the particles are less than 5 microns, preferably less than 1 micron, in size. Colloidal metal oxides are discrete finely divided particles of metal oxide having one or more of their dimensions within a range of about 3 nanometers to about one micrometer. Examples of these colloidal metal oxides include lithium oxide, manganese oxide, zirconium oxide, silica, chromium oxide, praseodymium oxide, dysprosium oxide, samarium oxide, cobalt oxide, zinc oxide, neodymium oxide, yttrium oxide, ytterbium oxide, magnesium oxide, nickel oxide, silica, manganese oxide, lanthanum oxide, gadolinium oxide, dysprosium oxide, europium oxide, ferric oxide, hanium oxide, and erbium oxide.

Typically, the use of a metal oxide modifier can decrease the porosity of the sintered mineral particle and thereby increase the density. Additionally certain metal oxide precursors may reduce the temperature at which transitional aluminas transform into alpha alumina. Certain metal oxides may react with the alumina to form a reaction product which may be beneficial in enhancing the physical properties of the mineral particle. Thus, the selection and amount of metal oxide will depend, in part, upon the processing conditions and the desired properties of the mineral particle.

Oxides of cobalt, nickel, zinc, and magnesium typically react with alumina to form a spinel, whereas zirconia and hafnia do not react with the alumina. Alternatively, the reaction products of dysprosium oxide and gadolinium oxide with alumina oxide are generally garnet. The reaction products of alumina with praseodymium oxide, ytterbium oxide, erbium oxide, and samarium oxide generally have a perovskite and/or garnet structure. Yttria can also react with alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$+, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $CO^{2+}$. Such aluminates have a hexagonal crystal structure; these aluminates are sometimes referred to as a magnetoplumbite platelets. For additional details regarding the inclusion of metal oxide (and/or precursors thereof) in a boehmite mixture see, for example, in U.S. Pat. Nos. 4,314,827; 4,770,671; 4,881,951; 5,429,647; and 5,551,963.

The alumina-based mixtures typically comprise greater than 15% by weight (generally from greater than 30% to about 80% by weight) solids, based on the total weight of the mixture. Certain mixtures, however, comprise 35% by weight or more, 45% by weight or more, 50% by weight or more, 55% by weight or more, 60% by weight or more, as well as 65% by weight or more solids, based on the total weight of the mixture.

The mixture may be prepared, for example, by gradually adding a liquid medium to a component(s) that is non-soluble in the liquid medium, while the latter is mixing or tumbling. For example, a liquid medium containing water, nitric acid, and metal salt may be gradually added to boehmite, while the latter is being tumbled such that the liquid medium is more easily distributed throughout the boehmite. Alternatively, the mixture may be formed by combining boehmite, water and acid and then mixed to form essentially a homogeneous mixture. Next, nucleating agents and/or metal oxide precursors may be added to this mixture.

Suitable mixers include pail mixers, sigma blade mixers, ball mill and high shear mixers. Other suitable mixers are available from Eirich Machines, Inc., Gurnee, Ill.; Hosokawa-Bepex Corp., Minneapolis, Minn. (including a mixer available under the trade designation "SCHUGI FLEX-O-MIX", Model FX-160); and Littleford-Day, Inc., Florence, Ky.

After the alumina-based mixture is formed, the mixture may be heated to increase the dispersibility of the alpha alumina monohydrate and/or to create a homogeneous mixture. The temperature may vary, for example, the temperature may range from about 20 to 80° C., usually between 25 to 75° C. Alternatively, the mixture may be heated under a pressure ranging from 1.5 to 130 atmospheric pressure.

The mixture may gel prior to or during the drying step. The addition of most modifiers may result in the mixture gelling faster. The pH of the mixture and concentration of ions in the gel generally determines how fast the mixture gels. Typically, the pH of the mixture is within a range of about 1.5 to about 4. The gelled mixture may be extruded.

Drying Step: In general, techniques for drying the mixture are known in the art, including heating to promote evaporation of the liquid medium or simply drying in air. The drying step generally removes a significant portion of the liquid medium from the mixture; however, there still may be a minor portion (e.g., about 10% or less by weight) of the liquid medium present in the dried mixture. Typical drying conditions include temperatures ranging from about room temperature to over about 200° C., typically between 50 to 150° C. The times may range from about 30 minutes to several days.

Converting Step: After drying, the dried mixture may be converted into precursor particles. One typical means to generate these precursor particles is by a crushing technique. Various crushing or comminuting techniques may be employed such as a roll crusher, jaw crusher, hammer mill, ball mill and the like. Coarser particles may be recrushed to generate finer particles.

Alternatively, the dried mixture is shaped into lumps with a high volatilizable content which then are explosively communited by feeding the lumps directly into a furnace held at a temperature above 350° C., usually a temperature between 600 to 900° C.

Calcining Step: In general, techniques for calcining the dried mixture or ceramic precursor particles, wherein essentially all the volatiles are removed and the various components that were present in the mixture are transformed into oxides, are known in the art. Such techniques include using a rotary or static furnace to heat dried mixtures at temperatures ranging from about 400 to 1000° C. (typically from about 450 to 800° C.) until the free water, and typically until at least about 90% by weight of any bound volatiles, is removed.

Impregnating Step: A metal oxide modifier precursor can be impregnated into a calcined precursor particle, although this impregnation step is not required. The metal oxide modifier precursor is selected to provide the desired characteristic of the mineral particle. Typically, the metal oxide precursor is in the form of metal salts. Metal oxide precursors and metal salts are described above.

Methods of impregnating sol gel-derived mineral particles are described in general, for example, in U.S. Pat. No. 5,164,348. In general, ceramic precursor materials (i.e., dried alumina-based mixtures, dried ceramic precursor material, calcined alumina based mixtures or calcined ceramic precursor material) are porous. For example, a calcined ceramic precursor material typically has pores about 5 to 10 manometers in diameter extending into the material from an outer surface. The presence of such pores allows an impregnation composition comprising a mixture of liquid medium (typically water) and appropriate metal precursor to enter into ceramic precursor material. The impregnation process is thought to occur through capillary action.

The liquid medium used for the impregnating composition is preferably water (including deionized water), an organic solvent (preferably a non-polar solvent), or mixtures thereof. If impregnation of a metal salt is desired, the concentration of the metal salt in the liquid medium is typically in the range from about 5% to about 40% dissolved solids, on a theoretical metal oxide basis. Preferably, there is at least 50 ml of solution added to achieve impregnation of 100 grams of porous ceramic precursor material.

After the impregnation step, the resulting impregnated precursor particle is typically calcined a second time to remove any volatiles prior to sintering. Typical calcining conditions are described above.

Sintering Step: After the precursor particle is formed or optionally calcined, the precursor particle is sintered to provide a dense ceramic alpha alumina-based mineral particle. In general, techniques for sintering calcined material, which include heating at a temperature effective to transform transitional alumina(s) into alpha alumina, cause all of the metal oxide precursors to either react with the alumina or form metal oxide, and increase the density of the ceramic material, are known in the art. The calcined material may be sintered by heating (e.g., using electrical resistance, microwave, plasma, laser, or gas combustion both in batch or continuous processes). Sintering temperatures usually range from about 1200 to 1650° C., typically, from about 1200 to 1500° C. The length of time which the calcined material is exposed to the sintering temperature depends, for example, on particle size, composition of the particles, and sintering temperature. Typically, sintering times range from a few seconds to about 60 minutes (preferably, within about 3 to 30 minutes). Sintering is typically accomplished in an oxidizing atmosphere, although neutral or reducing atmospheres may also be used.

Crushing and Classification Steps: In some instances, the mineral particle is sintered to about the desired particle size and about the desired particle size distribution. The mineral particle may be further classified using screening techniques, air classification techniques or water classification techniques to further refine the particle size distribution. In some cases, the mineral particle is first crushed to a smaller particle size. This crushing may be accomplished for example, by roll crushing, jet milling, hammer milling, ball milling and the like. After crushing, the resulting particles are typically classified using screening techniques, air classification techniques or water classification techniques to further refine the particle size distribution.

The aluminum sol gel ceramic grain can also be made by other procedures known in the art and described in each of the following U.S. Patents which are specifically incorporated herein by reference: U.S. Pat. Nos. 4,623,364; 4,314,827; 4,744,802; and 4,800,685.

Sintered Alumina Mineral Particle Properties

The sintered alumina mineral particles have a true density of at least about 3.70 grams/cm$^3$, preferably at least about 3.80 grams/cm$^3$, more preferably at least about 3.85 grams/cm$^3$, and most preferably at least about 3.90 grams/cm$^3$. Likewise, it is preferred that the sintered alumina mineral particles have a theoretical density of at least about 90%, preferably at least about 93% and more preferably at least about 95%. The densities of the particles may be determined with a helium gas pycnometer (available under the trade designation "Micromeritics AccuPyc 1330" from Micromeritics Instruments Corp., Norcross, Ga.).

The sintered alumina mineral particles have a hardness of at least about 16 GPa, preferably at least about 17 GPa, more preferably at least about 18 GPa and most preferably at least about 19 GPa. In some instances, the hardness may be greater than about 20 GPa or greater than about 22 GPa. The hardness may be measured according to a Vicker's indentation method using a 500 gram weighted stylus. This test procedure is further described in accordance with ASTM (American Society of Testing Methods) Test Method E3 84.

The sintered alumina mineral particles have a toughness of at least about 2 MPa-m$^{0.5}$, preferably at least about 2.2 MPa-m$^{0.5}$, more preferably at least about 2.5 MPa-m$^{0.5}$, and most preferably at least about 2.8 MPa-m$^{0.5}$. In some instances, the toughness may be greater than about 3.0 MPa-m$^{0.5}$, or greater than about 4.0 MPa-m$^{0.5}$. The toughness may be measured according to a Vicker's indentation method using a 500 gram weighted stylus. The toughness may be measured according to a test procedure outlined in "Equilibrium Penny-Like Cracks in Indentation Fracture" by B R Lawn and E R Fuller published in the Journal of Material Science, Volume 10, 1974, pages 2016–2024.

EXAMPLE 1

ABRASION RESISTANT COATING COMPOSITION

The following coating composition is exemplary of a UV-curable coating composition used, for example, in floor finishing. The first step in preparation was to blend the following components:

| Ingredient % by Weight | Ingredient Name | Ingredient Type |
| --- | --- | --- |
| 6.14 | 1,6 hexanediol diacrylate | Difunctional acrylate oligomer |
| 6.46 | Photomer 4149 SR454 | Trifunctional acrylate oligomer |
| 6.30 | V-Pyrol, Caustic | Monofunctional monomer |
| 3.89 | Sartomer CN 292 | Tetrafunctional polyester acrylate |
| 3.55 | Photomer 3016-20R | Epoxy acrylate |
| 1.70 | Darocur 1173 | Photoinitiator |
| 7.27 | BYK-361 | Acrylated silicon flow agent |
| 35.30 | Sartomer CN 971A80 | Acrylated aromatic urethane |
| 1.05 | Benzophenone-flakes | Photoinitiator |

The above ingredients were then mixed for 20 minutes and thereafter the following components were sifted into the mix with blending:

| Ingredient % by Weight | Ingredient Name | Ingredient Type |
| --- | --- | --- |
| 0.24 | R-972 Aerosil | Precipitated silica (rheology modifier) |
| 28.11 | Cubitron MFM-321 (3M Corporation) | Sol gel process ceramic aluminum oxide mineral |

The resulting mixture was blended for 20 minutes at high speed to achieve a smooth consistency.

The above-described UV-curable coating composition of this invention was applied to wood surfaces and UV-cured to provide coatings exhibiting enhanced abrasion resistance in comparative abrasion resistance testing. The coating composition can be applied to a surface by any art-recognized methods including, but not limited to, the use of a brush, the use of a spray device, the use of a roller, and the like.

EXAMPLE 2

ABRASION RESISTANT COATING COMPOSITION

A similar procedure to that described in Example 1 was used to prepare a UV-curable coating composition except that the following ingredients were blended:

| Ingredient % by Weight | Ingredient Name | Ingredient Type |
|---|---|---|
| 11.08 | Tripropylene glycol diacrylate | Difunctional acrylate oligomer |
| 17.87 | 1,6 hexanediol diacrylate | Difunctional acrylate oligomer |
| 14.86 | Trimethylolpropane trimethacrylate | Trifunctional acrylate oligomer |
| 20.29 | Sartomer CN-975 | Tetrafunctional aromatic urethane acrylate |
| 2.40 | Darocur 1173 | Photoinitiator |
| 1.35 | BYK-P105 | Anti-settling agent |
| 0.12 | Sartomer CN 971A80 | Acrylated aromatic urethane |
| 30.61 | Benzophenone-flakes | Photoinitiator |

The above ingredients were then mixed for 20 minutes and thereafter the following components were sifted into the mix with blending:

| Ingredient % by Weight | Ingredient Name | Ingredient Type |
|---|---|---|
| 1.42 | Cubitron MFM-321 (3M Corporation) | Sol gel process ceramic aluminum oxide mineral |

The resulting mixture was blended for 20 minutes at high speed to achieve a smooth consistency and applied to wood surfaces as described in Example 1.

EXAMPLE 3

ABRASION RESISTANT COATING COMPOSITION

A similar procedure to that described in Example 1 was used to prepare a UV-curable coating composition except that the following ingredients were blended:

| Ingredient % by Weight | Ingredient Name | Ingredient Type |
|---|---|---|
| 10.00 | Isobonyl acrylate | Monofunctional monomer |
| 8.00 | Tripropylene glycol diacrylate | Monofunctional monomer |
| 8.00 | Trimethylpropane trimethylacrylate | Monofunctional monomer |
| 17.50 | aromatic urethane | oligomer |
| 17.50 | aliphatic urethane | oligomer |
| 2.00 | Trimethylbenzophenone | photoinitiator |
| 2.00 | Alpha hydroxy ketone | photoinitiator |
| 2.00 | BYK-331 | flow aid |
| 1.00 | BYK-A500 | defoaming agent |
| 2.00 | Disperbyk | wetting agent |

The above ingredients were then mixed for 20 minutes and thereafter the following components were sifted into the mix with blending:

| Ingredient % by Weight | Ingredient Name | Ingredient Type |
|---|---|---|
| 30.00 | Cubitron MFM-321 (3M Corporation) | Sol gel process ceramic aluminum oxide mineral |

The resulting mixture was blended for 20 minutes at high speed to achieve a smooth consistency and applied to wood surfaces as described in Example 1.

EXAMPLE 4

WEAR RESISTANCE TESTS OF ABRASIVE COATING COMPOSITIONS

The abrasion resistant coating composition described in Example 1 was subjected to the various wear resistance tests described below. The test results were as follows:

Taber Wear Resistance Test

A Taber Wear Resistance Test was performed on the coating composition described in Example 1. The coating composition was applied to either a sliced engineered product or a sliced face engineered product (designated sliced 1 and sliced 2, respectively) or to a rotary engineered product or a rotary faced engineered product (designated rotary 1 and rotary 2, respectively) and initial and final wear were tested using a standard Taber Wear Resistance Test. This test determines abrasion resistance of coatings to abrasion produced by a Taber Abrasion Machine. Briefly, the test required measuring the initial coating thickness of the test specimen in several places. The test specimen was then mounted on a turntable and the abrading heads of the Taber Abrasion Machine were placed on the test specimen and the test specimen was subjected to abrasion until wear-through occurred. The abrading heads of the Taber Abrasion Machine were CS-0 wheels fitted with S-33 sandpaper strips and each wheel was weighted with a 500 gram weight. "Initial Wear" indicates the number of cycles to observe wear-through in any test area of the test specimen while "Final Wear" indicates the number of cycles required to observe wear-through in all test areas of the test specimen. Wear conversion was calculated by dividing the number of cycles to wear-through by the film thickness and is expressed below as the number of cycles required to remove a millimeter of coating thickness. Thus, wear conversion is an indication of abrasion resistance and the higher the wear conversion value the greater the abrasion resistance.

| Sample | Initial Wear | Final Wear | Film Thickness | Wear Conversion |
|---|---|---|---|---|
| Sliced 1 | 550 cycles | 855 cycles | 1.74 mils | 491.38 cycles/mil |
| Sliced 2 | 1040 cycles | 1075 cycles | 1.64 mils | 655.49 cycles/mil |
| Rotary 1 | 1035 cycles | 1080 cycles | 1.66 mils | 650.6 cycles/mil |
| Rotary 2 | 1525 cycles | 1646 cycles | 1.75 mils | 940.57 cycles/mil |

Crosshatch Adhesion Test

The crosshatch adhesion values were determined using a Gardco Crosshatch Cutter and standard tape. This test involved scratching a crosshatched pattern of squares onto the surface of a product to which the coating composition described in Example 1 was applied. Tape was then applied over the pattern of squares and was subsequently removed to determine the number of squares removed by the tape. The test provides an indication of the capacity of the coating composition to adhere to surfaces.

| Sample | % Adhesion | Adhesion Rating |
|---|---|---|
| Sliced 1 | 94.8 | 38 |
| Sliced 2 | 93.4 | 38 |
| Rotary 1 | 99.6 | 48 |
| Rotary 2 | 99.2 | 48 |

Scrape Adhesion Test

The scrape adhesion was determined using a Balanced Beam Adhesion Tester fitted with a barrel scrape apparatus. Mass was added until a scrape through the finish was observed.

| Sample | Mass for Scrape (grams) |
|---|---|
| Sliced 1 | 900 |
| Sliced 2 | 950 |
| Rotary 1 | 1300 |
| Rotary 2 | 1700 |

EXAMPLE 5

GLOSS AND ACETONE CURE TESTS

The abrasion resistant coating composition described in Example 1 was subjected to gloss and acetone cure tests as described below. The coating composition was first applied to either a sliced engineered product or a sliced face engineered product (designated sliced 1 and sliced 2, respectively) or to a rotary engineered product or a rotary faced engineered product (designated rotary 1 and rotary 2, respectively). The test results were as follows:

Gloss Test

The gloss was determined using a 60 degree glossmeter.

| Sample | Gloss |
|---|---|
| Sliced 1 | 64.5 |
| Sliced 2 | 66.9 |
| Rotary 1 | 66.5 |
| Rotary 2 | 61.5 |

Acetone Cure Test

The acetone cure test was performed by soaking gauze with acetone, placing the acetone soaked-gauze on the test samples, and covering the gauze with a glass plate and 10 pounds of weight for 15 minutes to determine if the coatings on the test samples were completely cured.

| Sample | Acetone Pass/Fail |
|---|---|
| Sliced 1 | Pass |
| Sliced 2 | Pass |
| Rotary 1 | Pass |
| Rotary 2 | Pass |

EXAMPLE 6

COMPARISON OF WEAR RESISTANCE OF ABRASION RESISTANT COATINGS WITH COMMERCIALLY AVAILABLE PRODUCTS

The abrasion resistant coating compositions described in Examples 1 and 3 were subjected to Taber Wear Resistance tests along with three commercially available products for comparison of wear resistance. The Taber Wear Resistance test was performed as described in Example 4 except that the abrasive wheels of the Taber Abrasion Machine were CS-17 wheels (covered with abrasive tape standard to CS-17 wheels), wheels fitted with S-42 sandpaper, or wheels fitted with abrasive S-39 leather as indicated in the table below. The abrasive wheels were weighted with weights of 500 or 1000 grams as also indicated in the table. The coating compositions described in Examples 1 and 3 were designated samples 1 and 2, respectively. The test results were reported as cycles to wear-through and were as follows:

| Sample | CS-17 wheels and 1000 gram weights | S-42 sandpaper and 500 gram weights | S-39 leather and 1000 gram weights |
|---|---|---|---|
| Sample 1 | 5300 cycles | 300 cycles | 1600 cycles |
| Sample 2 | 3300 cycles | 1200 cycles | 1000 cycles |
| Commercial Product 1 | 3000 cycles | 600 cycles | 1500 cycles |
| Commercial Product 2 | 2000 cycles | 1000 cycles | 1000 cycles |
| Commercial Product 3 | 1800 cycles | 75 cycles | 1000 cycles |

The results shown in the table demonstrate that samples 1 and 2 have enhanced wear resistance in a Taber Wear Resistance test where CS-17 abrasive wheels and 1000 gram weights were used.

What is claimed is:

1. A coating composition for forming abrasion-resistant coatings, said coating composition comprising a film-forming resin composition and a sol gel process ceramic grain composition wherein the ceramic grain contains aluminum oxide, wherein the aluminum oxide grain forms about 1 to about 60 percent by weight of the coating, and wherein the aluminum oxide grain ranges from about 0.5 μm to 130 μm in size.

2. The composition of claim 1 wherein the film-forming resin composition comprises a thermosetting resin.

3. The coating composition of claim 2 wherein the thermosetting resin comprises epoxy resins, acrylic resins, polyester resins, urea, melamines or polyurethane resins.

4. The composition of claim 1 wherein the film-forming resin composition comprises a UV-curable resin.

5. The composition of claim 4 wherein the UV-curable resin comprises olefin functional monomers and olefin functional oligomers or polymers.

6. The coating composition of claim 5 wherein the olefin functional oligomers or polymers comprise polyurethanes.

7. The coating composition of claim 1 wherein the sol gel process ceramic grain composition comprises alumina.

8. The composition of claim 7 wherein the sol gel processed alumina forms about 10 to about 40 weight percent of the coating.

9. A coating composition for forming abrasion-resistant coatings, said coating composition comprising a film-forming resin composition and a sol gel process ceramic grain composition wherein the ceramic grain contains aluminum oxide, wherein the aluminum oxide grain forms about 1 to about 60 percent by weight of the coating, and wherein the aluminum oxide grain ranges from about 0.5 μm to 130 μm in size, said coating composition having a viscosity of about 200 to about 8000 centipoise.

10. The composition of claim 9 wherein the film-forming resin composition comprises a thermosetting resin.

11. The coating composition of claim 10 wherein the thermosetting resin comprises epoxy resins, acrylic resins, polyester resins, urea resins, melamines or polyurethane resins.

12. The composition of claim 9 wherein the film-forming resin composition comprises a UV-curable resin.

13. The composition of claim 12 wherein the UV-curable resin comprises olefin functional monomers and olefin functional oligomers or polymers.

14. The coating composition of claim 13 wherein the olefin functional oligomers or polymers comprise polyurethanes.

15. The coating composition of claim 9 wherein the sol gel process ceramic grain composition comprises alumina.

16. The composition of claim 15 wherein the sol gel processed alumina forms about 10 to about 40 weight percent of the coating.

* * * * *